US012645030B2

(12) United States Patent　　　　(10) Patent No.: US 12,645,030 B2
Suwa et al.　　　　　　　　　　　　(45) Date of Patent: Jun. 2, 2026

(54) OPTICAL FIBER FUSION SPLICER AND METHOD FOR FUSION SPLICING OPTICAL FIBER

(71) Applicant: Sumitomo Electric Optifrontier Co., Ltd., Yokohama (JP)

(72) Inventors: Takahiro Suwa, Yokohama (JP); Kazufumi Joko, Yokohama (JP); Tomoyoshi Sasaki, Yokohama (JP); Kazuyoshi Ooki, Yokohama (JP)

(73) Assignee: Sumitomo Electric Optifrontier Co., Ltd., Yokohama (JP)

( * ) Notice: Subject to any disclaimer, the term of this patent is extended or adjusted under 35 U.S.C. 154(b) by 915 days.

(21) Appl. No.: 17/760,210

(22) PCT Filed: Jan. 18, 2021

(86) PCT No.: PCT/JP2021/001470
§ 371 (c)(1),
(2) Date: Aug. 5, 2022

(87) PCT Pub. No.: WO2021/161724
PCT Pub. Date: Aug. 19, 2021

(65) Prior Publication Data
US 2023/0038405 A1　　　Feb. 9, 2023

(30) Foreign Application Priority Data
Feb. 13, 2020　　(JP) ................................. 2020-022287

(51) Int. Cl.
*G02B 6/255* (2006.01)

(52) U.S. Cl.
CPC ......... *G02B 6/2553* (2013.01); *G02B 6/2555* (2013.01)

(58) Field of Classification Search
CPC ............................ G02B 6/2555; G02B 6/2553
(Continued)

(56) References Cited

U.S. PATENT DOCUMENTS

| | | | |
|---|---|---|---|
| 6,186,675 B1 | 2/2001 | Ruegenberg | |
| 6,439,782 B1 * | 8/2002 | Otani ................... | G02B 6/2551 |
| | | | 385/96 |

(Continued)

FOREIGN PATENT DOCUMENTS

| | | | |
|---|---|---|---|
| JP | 63187206 A | * | 1/1988 |
| JP | S63-187206 A | | 8/1988 |

(Continued)

OTHER PUBLICATIONS

JP11119049A Google translation (Year: 2025).*

(Continued)

*Primary Examiner* — Steven W Crabb
*Assistant Examiner* — Yeong Juen Thong
(74) *Attorney, Agent, or Firm* — McDonald Hopkins LLC

(57) ABSTRACT

An optical fiber fusion splicer includes an image acquisition unit, a condition setting unit, and a fusion splicing unit. The image acquisition unit acquires an image including each of end surfaces of first and second optical fibers that are splicing targets in a state where the end surfaces of the first and second optical fibers are disposed to face each other. The condition setting unit sets splicing conditions in accordance with a state of each of the end surfaces by identifying the state of each of the end surfaces on the basis of the image. The fusion splicing unit fusion-splices the first and second optical fibers together by means of discharge between a pair of electrode bars in accordance with the splicing conditions set by the condition setting unit.

10 Claims, 15 Drawing Sheets

(58) Field of Classification Search
USPC ................................. 219/121.11, 137.71, 660
See application file for complete search history.

(56) References Cited

U.S. PATENT DOCUMENTS

| | | | |
|---|---|---|---|
| 9,086,538 B2 * | 7/2015 | Endo .................... | G02B 6/2551 |
| 2004/0071414 A1 * | 4/2004 | Liang ................... | G02B 6/2551 |
| | | | 385/96 |
| 2005/0041939 A1 | 2/2005 | Saito et al. | |
| 2007/0081772 A1 | 4/2007 | Mendel et al. | |
| 2009/0103870 A1 * | 4/2009 | Solomon ............. | G02B 6/3801 |
| | | | 385/98 |
| 2011/0309056 A1 * | 12/2011 | Zheng ................. | G02B 6/2553 |
| | | | 219/121.11 |
| 2020/0056960 A1 | 2/2020 | Kise et al. | |

FOREIGN PATENT DOCUMENTS

| | | |
|---|---|---|
| JP | H10-206670 A | 8/1998 |
| JP | H11-119049 A | 4/1999 |
| JP | 2005-031439 A | 2/2005 |
| JP | 2020-020997 A | 2/2020 |

OTHER PUBLICATIONS

JPH11119049A Google Translated doc (Year: 2025).*
JP63187206A machine translate (Year: 1988).*
International Search Report issued in Patent Application No. PCT/JP2021/001470 dated Apr. 13, 2021.

* cited by examiner

OPTICAL FIBER FUSION SPLICER AND METHOD FOR FUSION SPLICING OPTICAL FIBER

TECHNICAL FIELD

The present disclosure relates to an optical fiber fusion splicer and a method for fusion splicing optical fibers. This application claims the benefit of priority from Japanese Patent Application No. 2020-022287, filed on Feb. 13, 2020, the entire contents of which are incorporated herein by reference.

BACKGROUND ART

Patent Literature 1 discloses a technology related to an optical fiber fusion splicer. The fusion splicer described in this literature is a device for fusion-splicing two optical fibers together. This device includes an image capturing means, an information extracting means, a storage means, a selection means, a discharge means, and a control means. The image capturing means obtains a transmitted light image of end portions of the two optical fibers using transmitted light. The information extracting means extracts end surface information of each of the two optical fibers utilizing a luminance distribution of the transmitted light image. The storage means stores a plurality of sets of splicing conditions in advance. The selection means selects splicing conditions corresponding to the end surface information from the plurality of sets of splicing conditions. The discharge means generates arc discharge for irradiating splicing end surfaces of the two optical fibers. The control means controls a discharge energy amount of arc discharge in accordance with the splicing conditions selected by the selection means.

CITATION LIST

Patent Literature

[Patent Literature 1] Japanese Unexamined Patent Publication No. 2005-31439

SUMMARY OF INVENTION

An optical fiber fusion splicer according to an aspect of the present disclosure includes an image acquisition unit, a condition setting unit, and a fusion splicing unit. The image acquisition unit acquires an image including each of end surfaces of first and second optical fibers that are splicing targets in a state where the end surfaces of the first and second optical fibers are disposed to face each other. The condition setting unit sets splicing conditions in accordance with a state of each of the end surfaces by identifying the state of each of the end surfaces on the basis of the image. The fusion splicing unit fusion-splices the first and second optical fibers together by means of discharge between a pair of electrode bars in accordance with the splicing conditions set by the condition setting unit. The splicing conditions include at least one of the following items; positions of the end surfaces before discharge starts, a gap between the end surfaces before discharge starts, a preliminary discharge time, a main discharge time, a push-in amount after the end surfaces have been brought into contact with each other, and a retraction amount after the end surfaces have been pushed in toward each other.

A method for fusion splicing optical fibers according to an aspect of the present disclosure includes an image acquiring step, a condition setting step, and a fusion splicing step. In the image acquiring step, an image including each of end surfaces of first and second optical fibers that are splicing targets is acquired in a state where the end surfaces of the first and second optical fibers are disposed to face each other. In the condition setting step, splicing conditions are set in accordance with a state of each of the end surfaces by identifying the state of each of the end surfaces on the basis of the image. In the fusion splicing step, the first and second optical fibers are fusion-spliced together by means of discharge between a pair of electrode bars in accordance with the splicing conditions set in the condition setting step. The splicing conditions include at least one of the following items; positions of the end surfaces before discharge starts, a gap between the end surfaces before discharge starts, a preliminary discharge time, a main discharge time, a push-in amount after the end surfaces have been brought into contact with each other, and a retraction amount after the end surfaces have been pushed in toward each other.

BRIEF DESCRIPTION OF DRAWINGS

FIG. 1 illustrates an appearance in a state where a windshield cover is closed.

FIG. 2 illustrates an appearance in a state where the windshield cover is open and an internal structure of the fusion splicer is revealed.

DESCRIPTION OF EMBODIMENT

Figure 1:
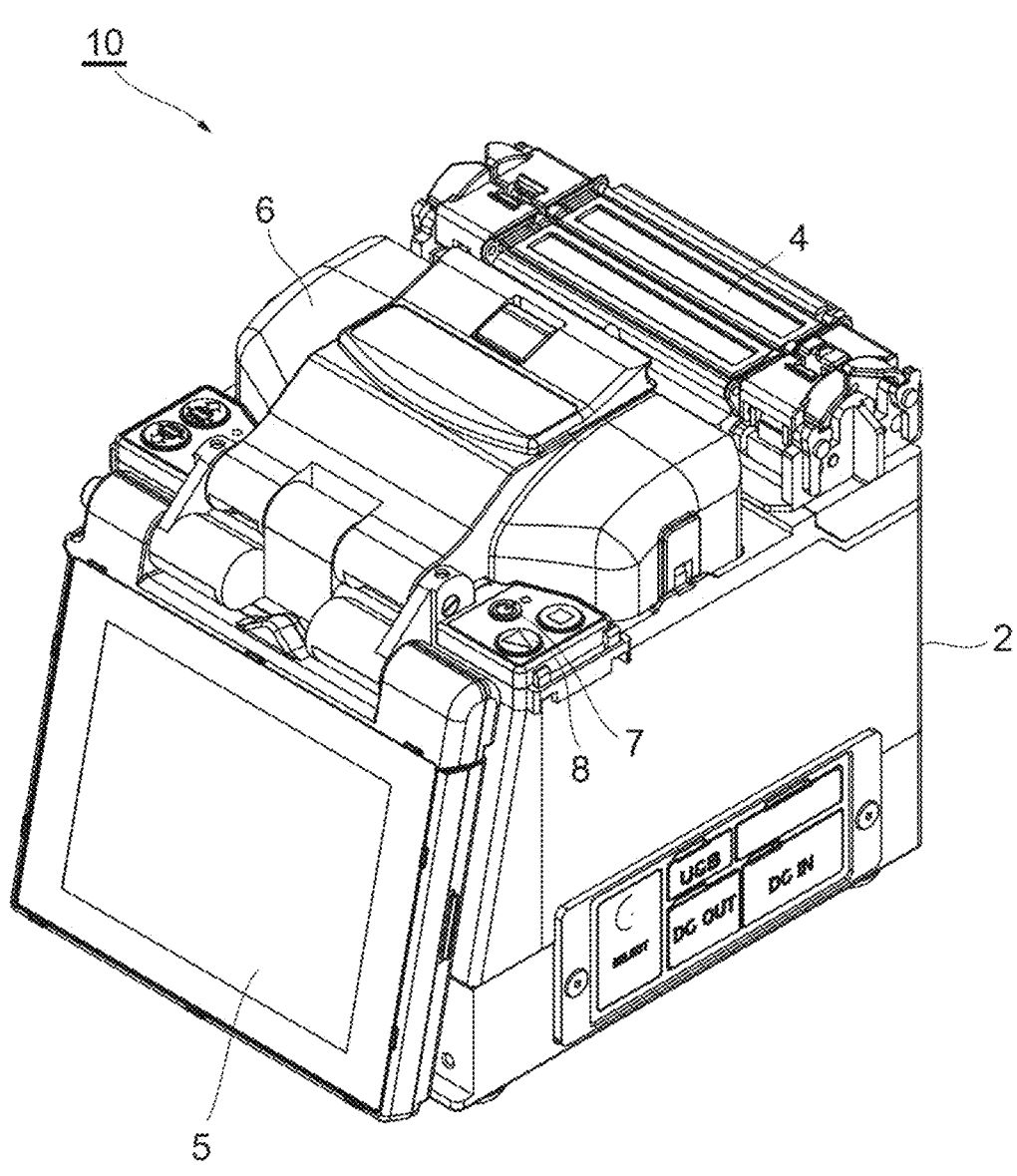
FIG. 1 is a perspective view illustrating an appearance of an optical fiber fusion splicer according to an embodiment.

Problem to be Solved by Present Disclosure

When fusion splicing of optical fibers is performed, splicing conditions, such as discharge power and positions of tips of optical fibers, are set. Depending on these splicing conditions, the quality of fusion splicing varies, and an amount of increase in transmission loss (splicing loss) in a fused part increases and decreases. Favorable splicing conditions vary in accordance with a state of end surfaces of optical fibers.

Effects of Present Disclosure

According to the present disclosure, it is possible to provide an optical fiber fusion splicer and a method for fusion splicing optical fibers, in which the quality of fusion splicing can be enhanced.

Description of Embodiment of Present Disclosure

First, an embodiment of the present disclosure will be enumerated and described. An optical fiber fusion splicer according to the embodiment includes an image acquisition unit, a condition setting unit, and a fusion splicing unit. The image acquisition unit acquires an image including each of end surfaces of first and second optical fibers that are splicing targets in a state where the end surfaces of the first and second optical fibers are disposed to face each other. The condition setting unit sets splicing conditions in accordance with a state of each of the end surfaces by identifying the state of each of the end surfaces on the basis of the image. The fusion splicing unit fusion-splices the first and second optical fibers together by means of discharge between a pair of electrode bars in accordance with the splicing conditions set by the condition setting unit. The splicing conditions include at least one of the following items; positions of the end surfaces before discharge starts, a gap between the end surfaces before discharge starts, a preliminary discharge time, a main discharge time, a push-in amount after the end surfaces have been brought into contact with each other, and a retraction amount after the end surfaces have been pushed in toward each other. Here, "an image including an end surface" is not limited to an image in which an end surface is directly captured but also includes an image in which an end surface is not directly shown in the image but a part including an end portion of an optical fiber is captured from a side surface.

A method for fusion splicing optical fibers according to the embodiment includes an image acquiring step, a condition setting step, and a fusion splicing step. In the image acquiring step, an image including each of end surfaces of first and second optical fibers that are splicing targets is acquired in a state where the end surfaces of the first and second optical fibers are disposed to face each other. In the condition setting step, splicing conditions are set in accordance with a state of each of the end surfaces by identifying the state of each of the end surfaces on the basis of the image. In the fusion splicing step, the first and second optical fibers are fusion-spliced together by means of discharge between a pair of electrode bars in accordance with the splicing conditions set in the condition setting step. The splicing conditions include at least one of the following items; positions of the end surfaces before discharge starts, a gap between the end surfaces before discharge starts, a preliminary discharge time, a main discharge time, a push-in amount after the end surfaces have been brought into contact with each other, and a retraction amount after the end surfaces have been pushed in toward each other. Here, "an image including an end surface" is not limited to an image in which an end surface is directly captured but also includes an image in which an end surface is not directly shown in the image but a part including an end portion of an optical fiber is captured from a side surface.

In the fusion splicer and the method for fusion splicing, the splicing conditions set in accordance with the state of each of the end surfaces include at least one of the following items; the positions of the end surfaces before discharge starts, the gap between the end surfaces before discharge starts, the preliminary discharge time, the main discharge time, the push-in amount after the end surfaces have been brought into contact with each other, and the retraction amount after the end surfaces have been pushed in toward each other. In this case, for example, compared to a case where only a discharge energy amount (discharge power) is controlled as in the device described in Patent Literature 1, more favorable splicing conditions can be set in accordance with the state of end surfaces of optical fibers. Thus, the quality of fusion splicing can be further enhanced and a splicing loss can be reduced.

In the optical fiber fusion splicer and the method for fusion splicing optical fibers described above, the splicing conditions may include at least three selected from the group of the positions, the gap, the preliminary discharge time, the main discharge time, the push-in amount, and the retraction amount. In this case, the quality of fusion splicing can be far further enhanced, and a splicing loss can be further reduced.

In the optical fiber fusion splicer and the method for fusion splicing optical fibers described above, the positions may be positions of the end surfaces based on a line connecting center axes of the pair of electrode bars at a start time of preliminary discharge. The preliminary discharge time may be a period of time from a time when arc discharge starts to a time when relative movement of the first and second optical fibers starts so as to cause the end surfaces to abut each other. The main discharge time may be a period of time from a time when the end surfaces abut each other to a time when applying of a voltage to the pair of electrode bars stops. The push-in amount may be a movement distance by which the first and second optical fibers are relatively moved further in the same direction during discharge after the end surfaces have abutted each other. The retraction amount may be a movement distance by which the first and second optical fibers are relatively moved in a direction in which the end surfaces are separated from each other during fusion splicing after the end surfaces have abutted each other and are further pushed in toward each other.

In the optical fiber fusion splicer and the method for fusion splicing optical fibers described above, the state of each of the end surfaces may include a generation position and a depth of a recess of each of the end surfaces. The state of each of the end surfaces may include a generation position and a height of a protrusion of an edge portion of each of the end surfaces. The state of each of the end surfaces may include a direction and an angle of an inclination of each of the end surfaces.

Details of Embodiment of Present Disclosure

Specific examples of an optical fiber fusion splicer and a method for fusion splicing optical fibers according to the present disclosure will be described below with reference to the drawings. The present invention is not limited to these examples. The present invention is indicated by the claims, and it is intended to include all changes within the meaning and the scope equivalent to the claims. In the following description, the same reference numerals will be applied to the same elements in description of the drawings, and redundant description thereof will be omitted.

Figure 2:
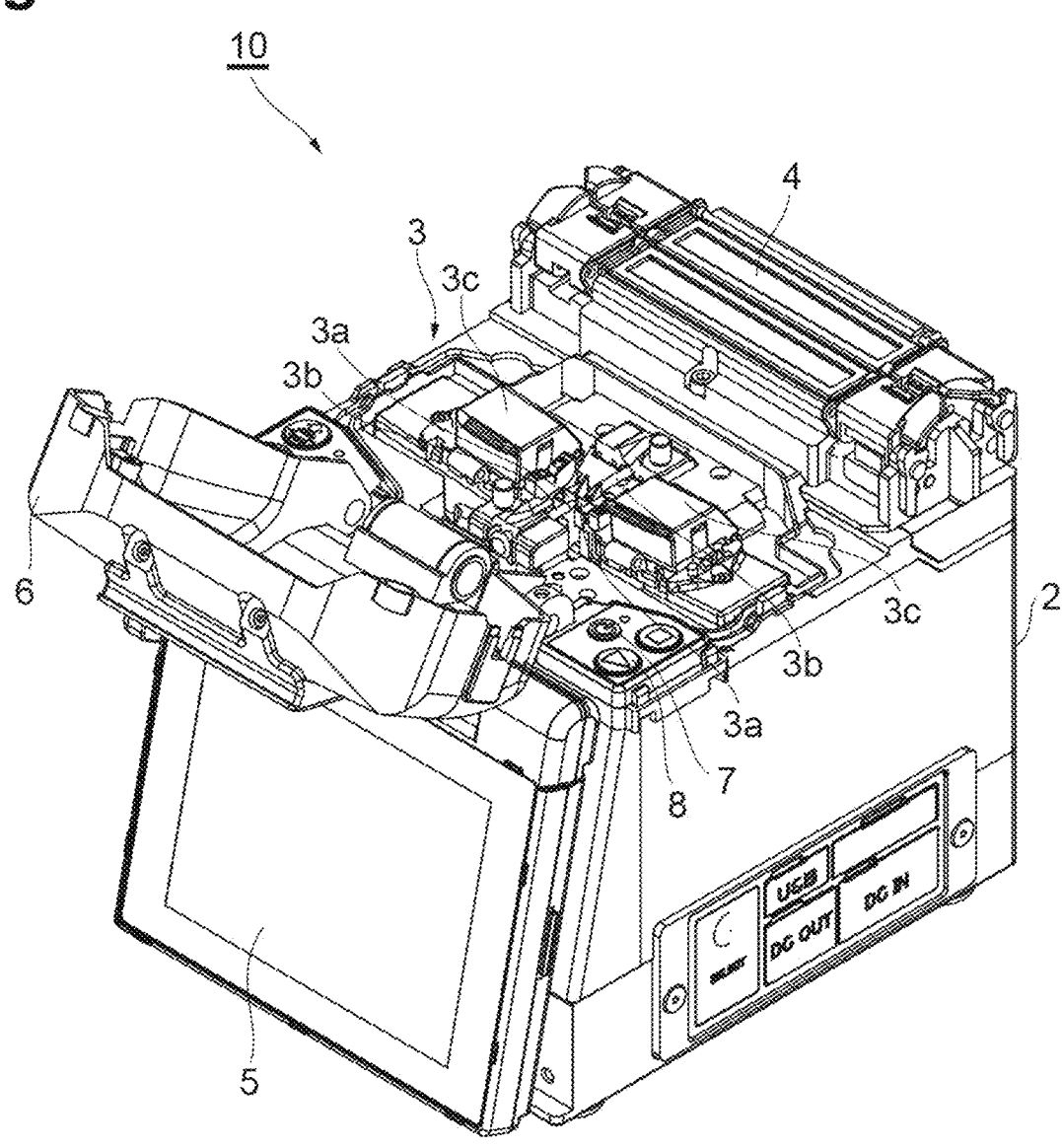
FIG. 2 is a perspective view illustrating an appearance of the optical fiber fusion splicer according to the embodiment.

FIGS. 1 and 2 are perspective views illustrating appearances of an optical fiber fusion splicer (which will hereinafter be simply referred to as a fusion splicer) 10 according to the present embodiment. FIG. 1 illustrates an appearance in a state where a windshield cover is closed. FIG. 2 illustrates an appearance in a state where the windshield cover is open and an internal structure of the fusion splicer 10 is revealed. The fusion splicer 10 is a device for fusion splicing optical fibers together by means of discharge. As illustrated in FIGS. 1 and 2, the fusion splicer 10 includes a box-shaped casing 2. A fusion splicing unit 3 for fusing optical fibers together and a heater 4 are provided in an upper portion of the casing 2. The heater 4 heats fiber reinforcement sleeves covering a fusion spot of optical fibers such that they contract. The fusion splicer 10 further includes a monitor 5, a windshield cover 6, a power source switch 7, and a splicing start switch 8. The monitor 5 displays diverse information. For example, diverse information includes an image of a fusion splicing status between optical fibers captured by a camera disposed inside the casing 2. The windshield cover 6 prevents wind from entering the fusion splicing unit 3. The power source switch 7 is a push button for switching between on and off of a power source of the fusion splicer 10 in accordance with an operation of a user. The splicing start switch 8 is a push button for starting operation for fusing optical fibers together in accordance with an operation of a user.

As illustrated in FIG. 2, the fusion splicing unit 3 has a pair of fiber positioning units 3*a*, a pair of electrode bars 3*b*, and a holder placement unit in which a pair of optical fiber holders 3*c* can be placed. Optical fibers (fusion targets) are respectively held and fixed in the optical fiber holders 3*c*, and each of the optical fiber holders 3*c* is placed and fixed in the holder placement unit. The fiber positioning units 3*a* are disposed between the pair of optical fiber holders 3*c* for positioning of tip portions of optical fibers respectively held by the optical fiber holders 3*c*. The electrode bars 3*b* are disposed between the pair of fiber positioning units 3*a* and soften the tips of optical fibers by means of arc discharge.

Figure 3:
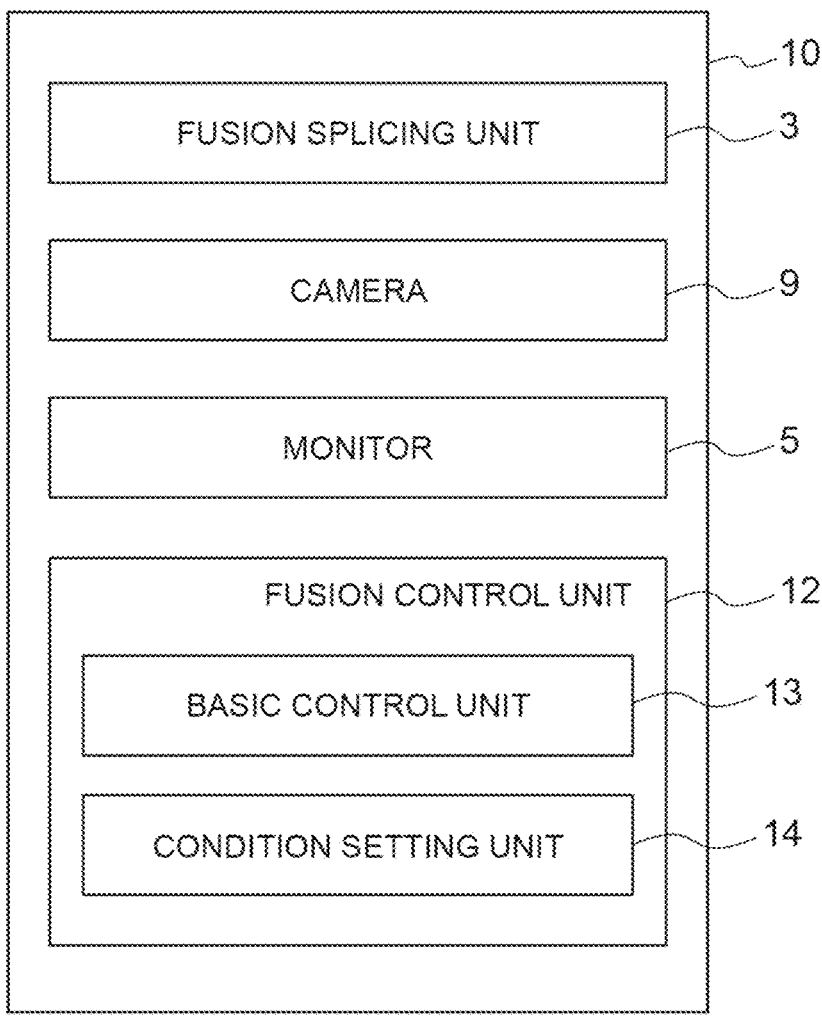
FIG. 3 is a functional block diagram showing a constitution of an internal system included in the fusion splicer.

FIG. 3 is a functional block diagram showing a constitution of an internal system included in the fusion splicer 10. As illustrated in FIG. 3, the fusion splicer 10 includes a fusion control unit 12, cameras 9, and the monitor 5, in addition to the fusion splicing unit 3 described above. The cameras 9 are examples of an image acquisition unit according to the present embodiment. The cameras 9 are disposed inside the casing 2. The cameras 9 generate image data by acquiring an image including each of end surfaces in a state where the end surfaces of two optical fibers (splicing targets) are disposed to face each other.

Figure 4:
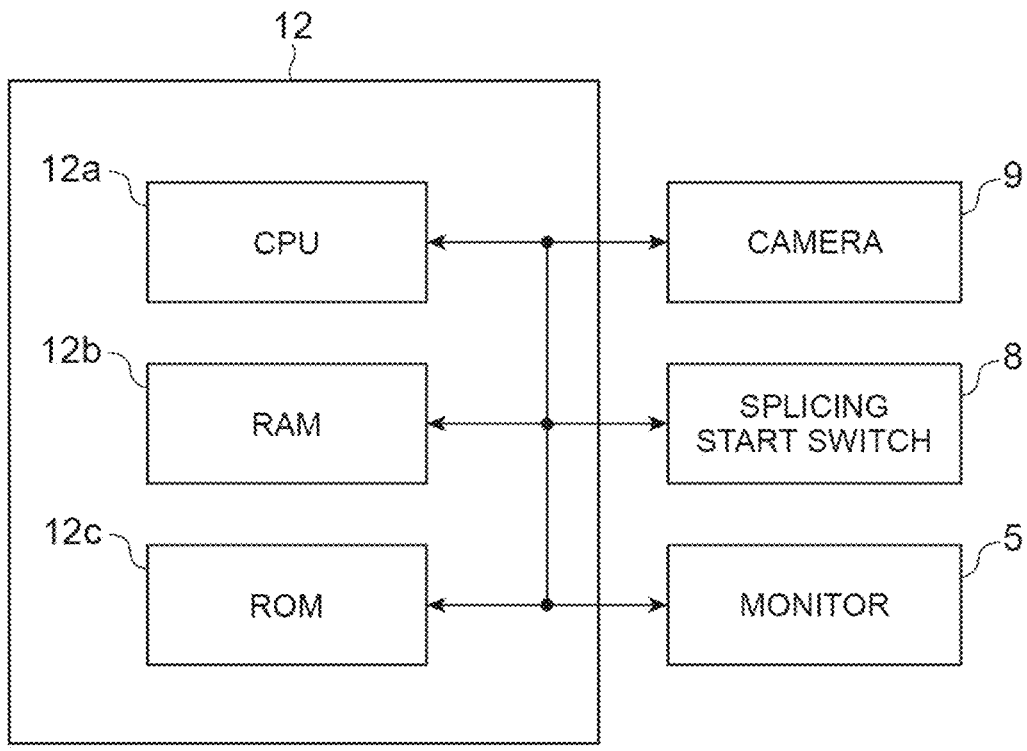
FIG. 4 is a block diagram showing an example of a hardware constitution of a fusion control unit.

FIG. 4 is a block diagram showing an example of a hardware constitution of the fusion control unit 12. As illustrated in FIG. 4, the fusion control unit 12 may be constituted as a computer including a CPU 12*a*, a RAM 12*b*, and a ROM 12*c*. The fusion controller 12 reads and writes data from and to the RAM 12*b* and ROM 12*c* under control of the CPU 12*a* while reading and executing a program stored in the ROM 12*c* in advance. Accordingly, the fusion control unit 12 can realize each function of the fusion control unit 12. An operation status of the fusion control unit 12 is displayed by the monitor 5 at all times while the fusion splicer 10 is in operation. The fusion control unit 12 is electrically connected to the splicing start switch 8. The fusion control unit 12 receives an electrical signal from the splicing start switch 8.

As illustrated in FIG. 3, the fusion control unit 12 is constituted to include a basic control unit 13 and a condition setting unit 14. The basic control unit 13 controls operation of the fusion splicing unit 3. The basic control unit 13 receives an operation of the splicing start switch 8 by a user and controls abutment operation and arc discharge between the tips of optical fibers in the fusion splicing unit 3. Abutment operation between the tips of optical fibers includes positioning processing of optical fibers by the fiber positioning units 3*a*, that is, control of tip positions of optical fibers. Control of arc discharge includes control of discharge power, a discharge start timing, and a discharge end timing. Various kinds of splicing conditions, such as the tip positions of optical fibers and discharge power, are stored in the ROM 12*c*, for example. Further, the splicing conditions are set by the condition setting unit 14. The condition setting unit 14 sets the splicing conditions in accordance with a state of each of the end surfaces by identifying the state of each of the end surfaces of two optical fibers on the basis of an image acquired by the cameras 9. When the splicing conditions are set, a plurality sets of splicing conditions may be prepared in advance, and a set may be selected from the sets of splicing conditions in accordance with the state of each of the end surfaces. Alternatively, the splicing conditions may be set through calculation from a predetermined approximation expression set in advance using particular numerical values obtained in accordance with the state of each of the end surfaces. Alternatively, both may be combined. That is, reference splicing conditions which have been prepared in advance may be set, and setting may be performed by calculating an amount of change from the reference splicing conditions from a predetermined approximation expression using particular numerical values obtained in accordance with the state of each of the end surfaces.

Figure 5:
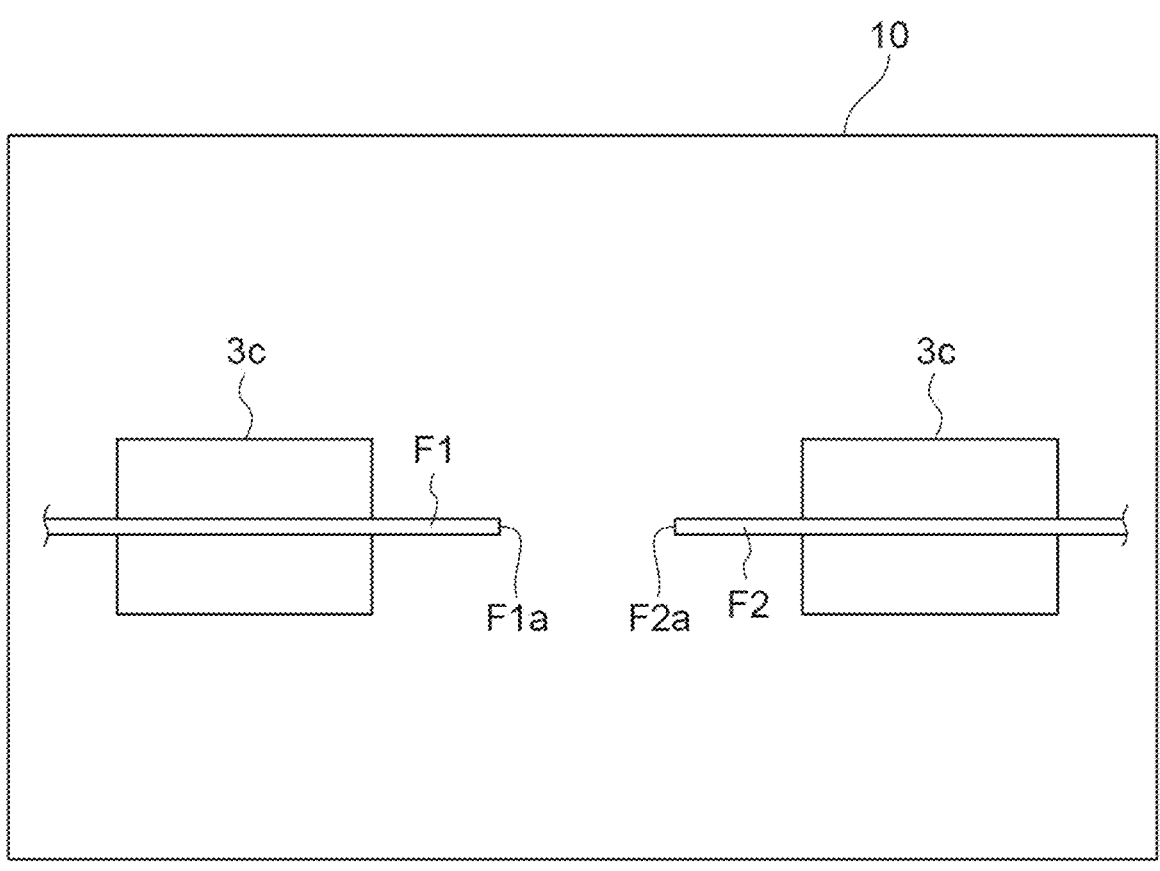
FIG. 5 is a view illustrating operation of the fusion splicer of the embodiment.
Figure 6:
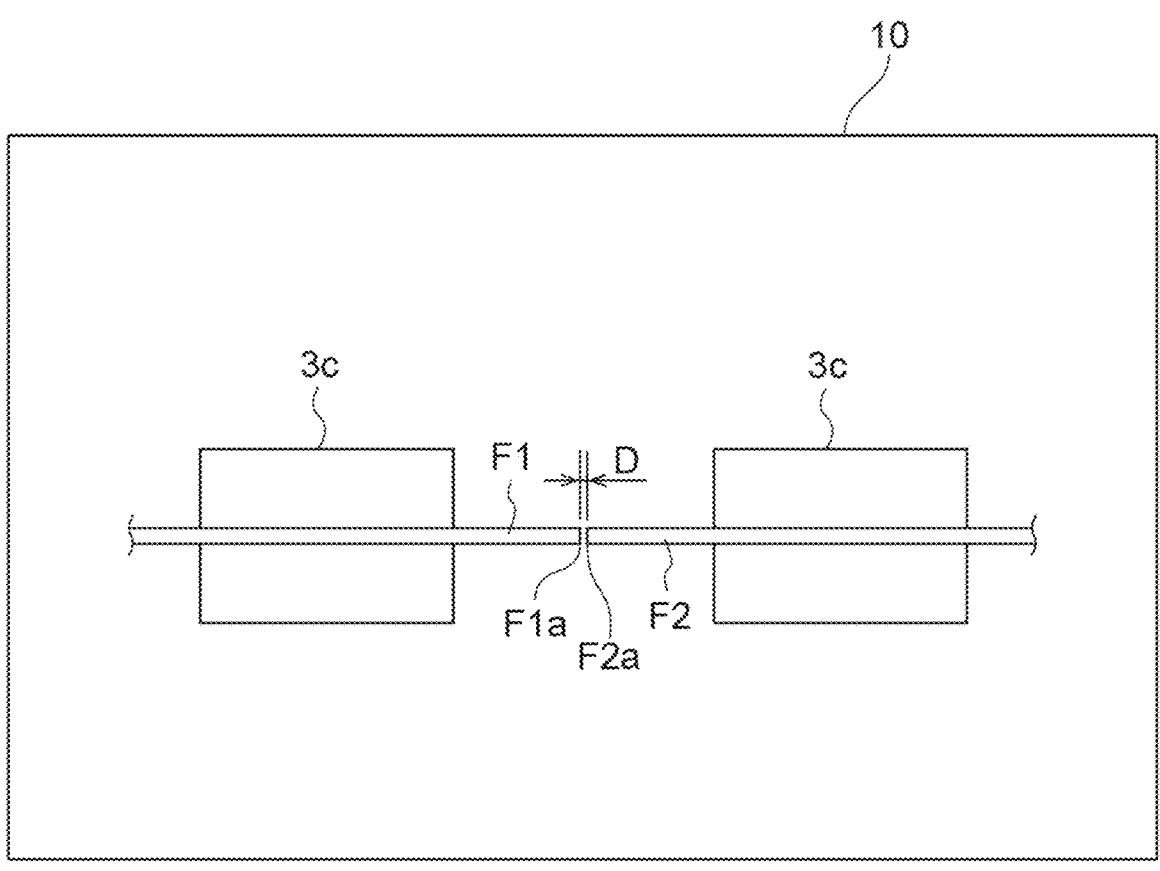
FIG. 6 is a view illustrating operation of the fusion splicer of the embodiment.
Figure 7:
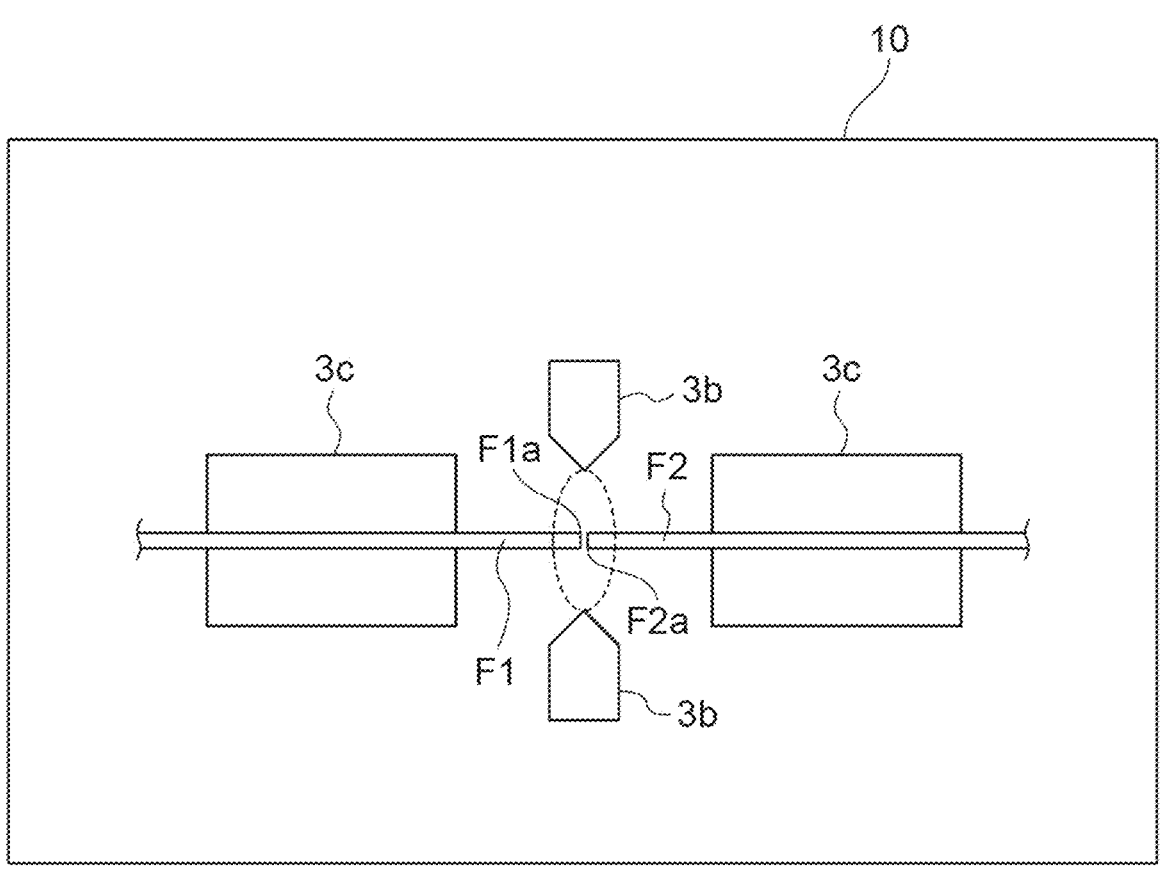
FIG. 7 is a view illustrating operation of the fusion splicer of the embodiment.

Operation of the fusion splicer 10 according to the present embodiment having the foregoing constitution is as follows. First, as illustrated in FIG. 5, a user causes the optical fiber holders 3*c* to respectively hold an optical fiber F1 (first optical fiber) and an optical fiber F2 (second optical fiber) that are splicing targets. Further, the optical fiber holders 3*c* are placed in the holder placement unit. At this time, an end surface F1*a* of the optical fiber F1 and an end surface F2*a* of the optical fiber F2 are disposed to face each other. Next, the user instructs the fusion splicer 10 to start fusion splicing. This instruction is performed using the splicing start switch 8. Upon this instruction, as illustrated in FIG. 6, the basic control unit 13 performs positioning of the optical fibers F1 and F2 on the basis of positions of the end surfaces F1*a* and F2*a* set as a splicing condition. Thereafter, as illustrated in FIG. 7, the basic control unit 13 starts arc discharge between the pair of electrode bars 3*b*.

Immediately after arc discharge starts, the end surfaces F1*a* and F2*a* are separated from each other. At this time, arc discharge corresponds to preliminary discharge for softening the end surfaces F1*a* and F2*a* in advance before fusion. When arc discharge starts, the basic control unit 13 brings the end surfaces F1*a* and F2*a* closer to each other such that they abut each other by controlling positions of the fiber positioning units 3*a*. Further, as the arc discharge continues (main discharge), the end surfaces F1*a* and F2*a* are further softened and are fused together.

Figure 8:
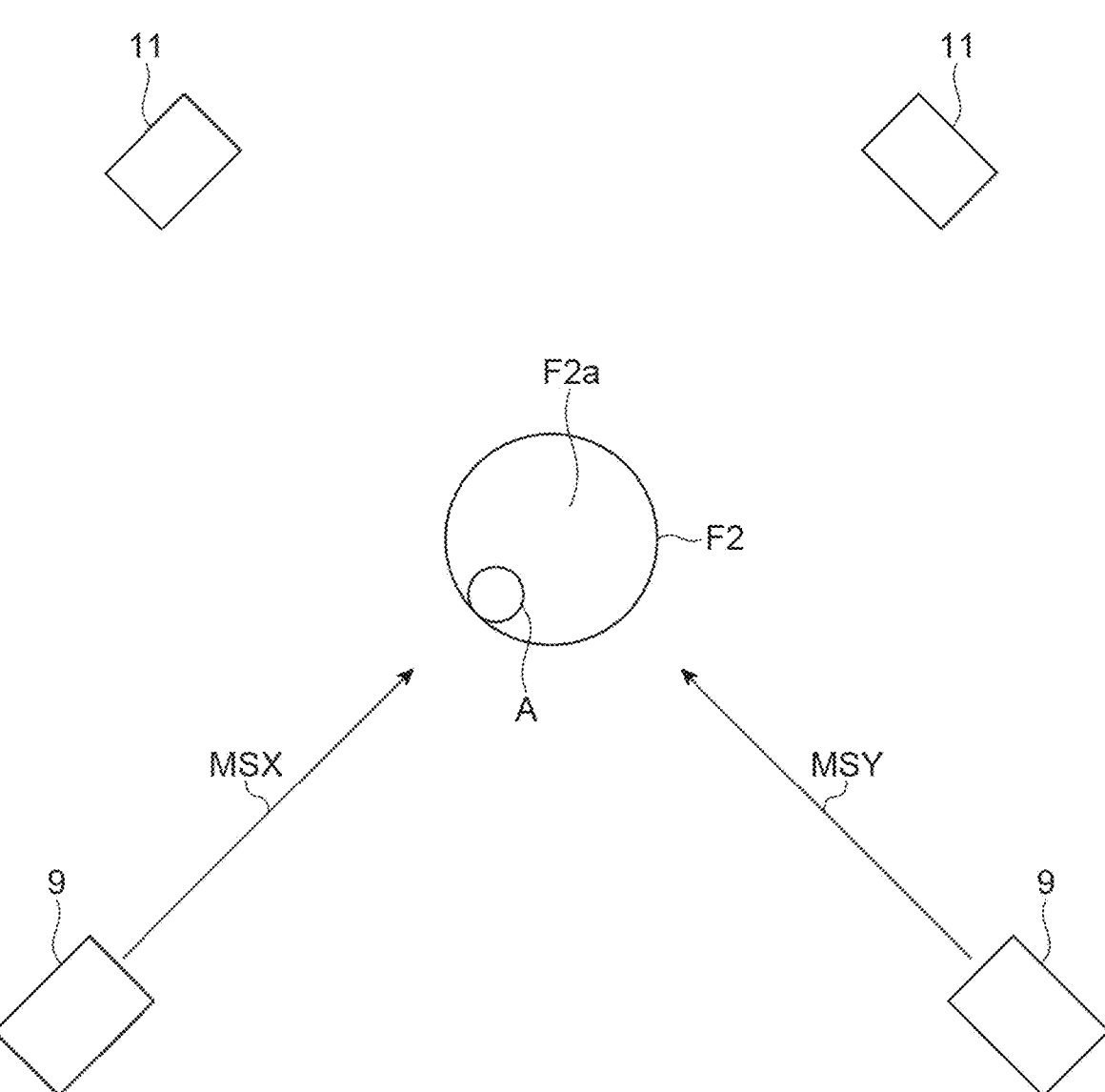
FIG. 8 is a view of an end surface of an optical fiber viewed in an optical axis direction.

Here, examples of states of each of the end surfaces F1*a* and F2*a* of the two optical fibers F1 and F2, which is information for making a decision for setting the splicing conditions, will be described. FIG. 8 is a view of the end surface F2*a* of the optical fiber F2 on one side viewed from a front surface (in an optical axis direction). Arrows MSX and MSY in the diagram respectively indicate observation directions of the cameras 9. That is, in this example, at least two cameras 9 are installed, and the two cameras 9 capture images of each of the end surfaces F1*a* and F2*a* in the directions MSX and MSY orthogonal to each other. The directions MSX and MSY intersect the optical axis direction of the optical fibers F1 and F2 and are orthogonal thereto in an example. Light sources 11 for illuminating the optical fibers F1 and F2 are disposed at positions facing the cameras 9 with the optical fibers F1 and F2 sandwiched therebetween.

Figure 9:
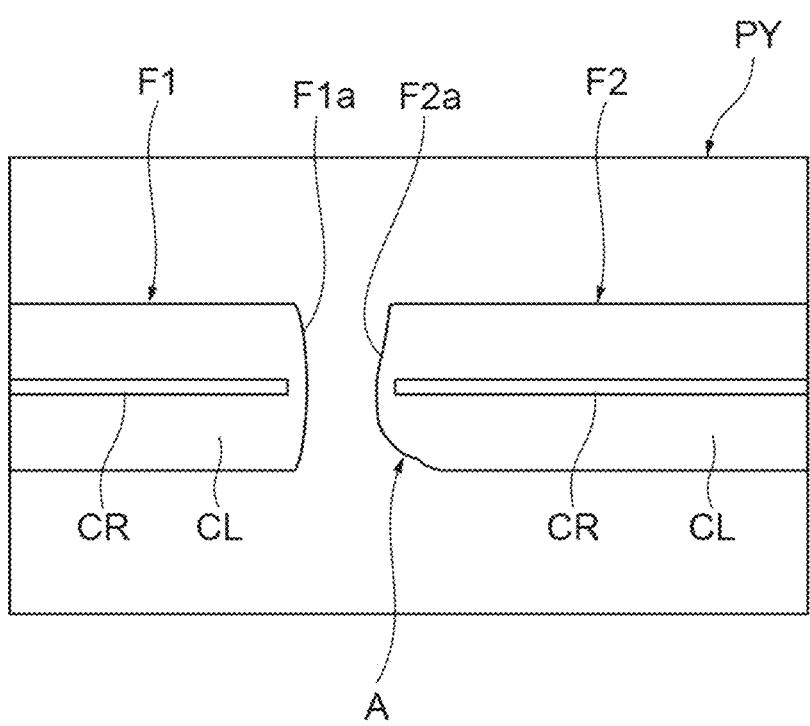
FIG. 9 is a view schematically illustrating an image obtained by a camera capturing an image in a certain direction.

Currently, it is assumed that a chip (recess) A has been generated at the position illustrated in FIG. 8 on the end surface F2*a*. In such a case, as illustrated in FIG. 9, in an image PY obtained by the camera 9 capturing an image in the direction MSY, the chip A on the end surface F2*a* is clearly shown. A generation position and a size (depth) of the chip A on the end surface F2*a* may be analyzed on the basis of two images obtained from the two cameras 9 which respectively capture images in the directions MSX and MSY. As illustrated in FIG. 9, in these images, positions and shapes of the optical fibers F1 and F2 are confirmed based on a contour of at least one of a core CR and a cladding CL. In the images, the core CR is brightened by illumination light from the light sources 11, and the cladding CL is darkened due to refraction of illumination light from the light sources 11.

Figure 10:
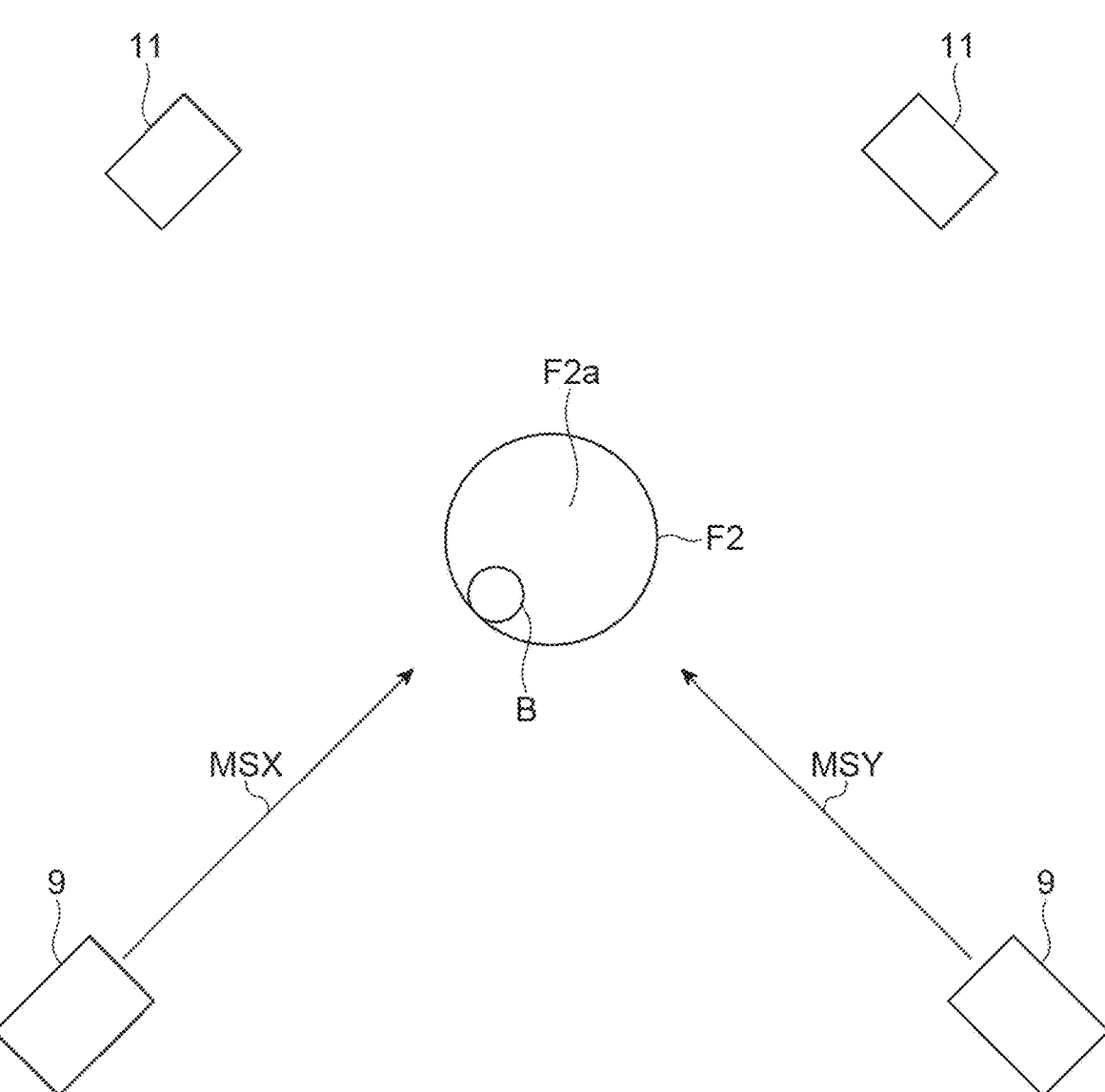
FIG. 10 is a view of an end surface of an optical fiber viewed in an optical axis direction.
Figure 11:
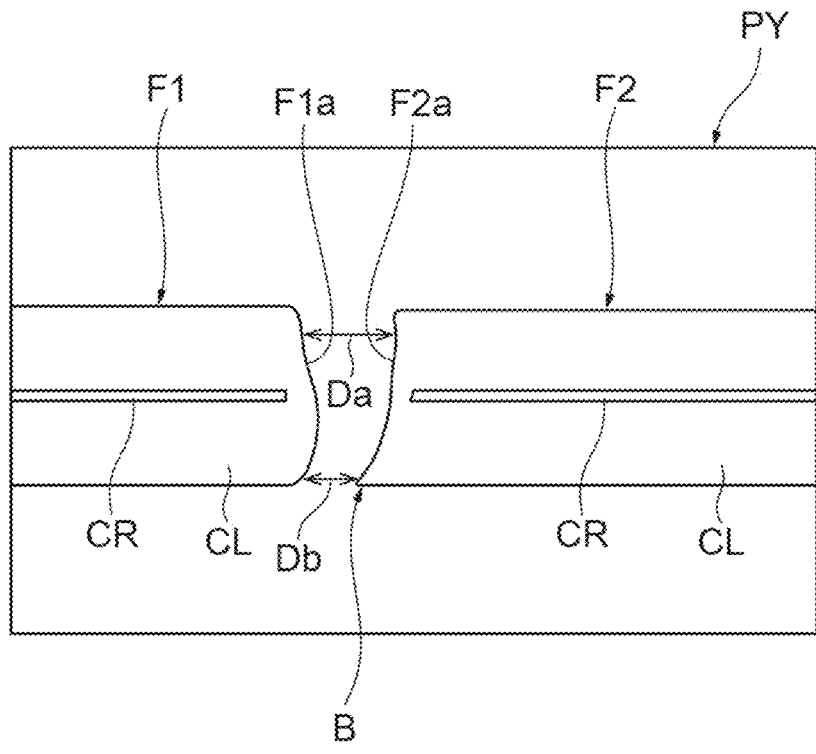
FIG. 11 is a view schematically illustrating an image obtained by a camera capturing an image in a certain direction.
Figure 12:
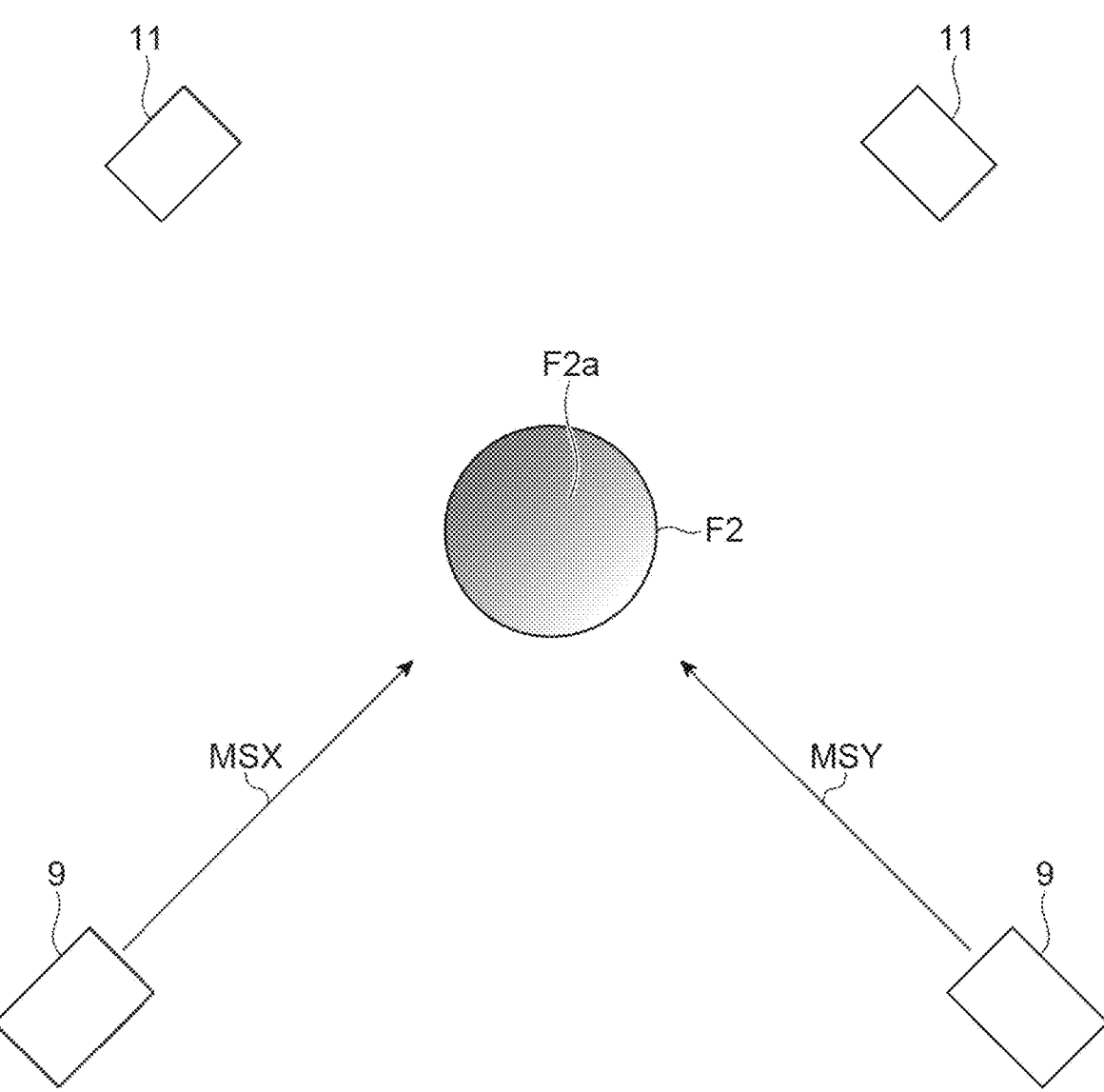
FIG. 12 is a view of an end surface of an optical fiber viewed in an optical axis direction.
Figure 13:
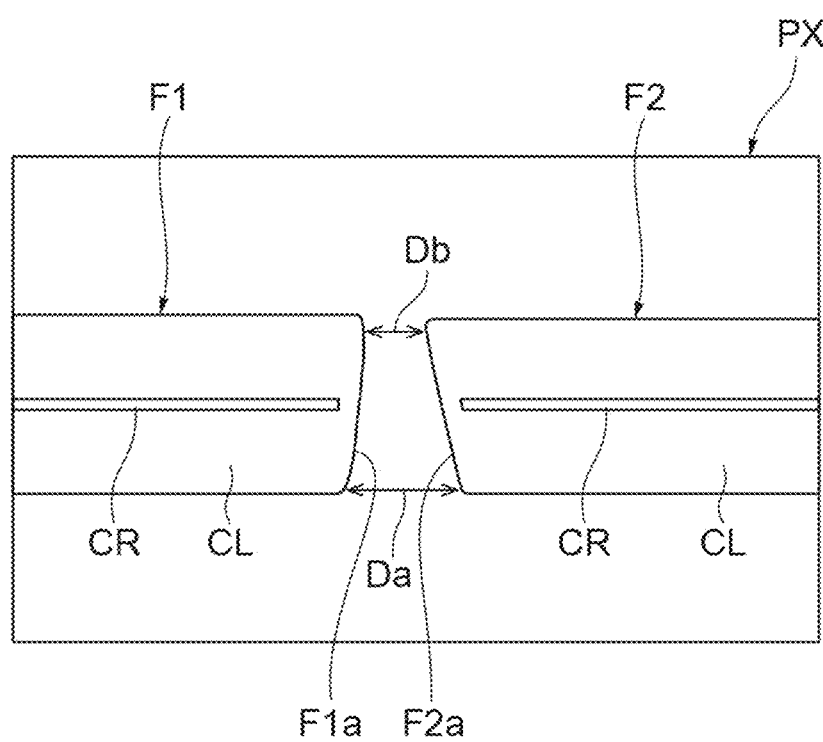
FIG. 13 is a view schematically illustrating an image obtained by a camera capturing an image in a different direction.

FIG. 10 is a view of the end surface F2*a* of the optical fiber F2 on one side viewed from the front (in the optical axis direction). It is assumed that a protrusion (lip) B of an edge portion has been generated at a position illustrated in FIG. 10 on the end surface F2*a*. In such a case, as illustrated in FIG. 11, in the image PY obtained by the camera 9 capturing an image in the direction MSY, the lip B projecting from the edge portion on the end surface F2*a* is clearly shown. A generation position and a size (height) of the lip B on the end surface F2*a* may be analyzed on the basis of two images obtained from the two cameras 9 which respectively capture images in the directions MSX and MSY FIG. 12 is a view of the end surface F2*a* of the optical fiber F2 on one side viewed from the front (in the optical axis direction) and expresses an inclination of the end surface F2*a* in the optical axis direction by the color darkness. That is, as the region becomes darker in color, it is farther from the facing end surface F1*a*, and as the region becomes lighter in color, it is closer to the facing end surface F1*a*. In this manner, it is assumed that an inclination in the direction illustrated in FIG. 12 has been generated on the end surface F2*a*. In such a case, as illustrated in FIG. 13, in an image PX obtained by the camera 9 capturing an image in the direction MSX, the inclination of the end surface F2*a* is clearly shown. A direction and a magnitude (angle) of the inclination of the end surface F2*a* may be analyzed on the basis of two images obtained from the two cameras 9 which respectively capture images in the directions MSX and MSY.

Next, the splicing conditions set in accordance with a state of each of the end surfaces F1*a* and F2*a* of the optical fibers F1 and F2 will be described in detail. In the present embodiment, the splicing conditions set in accordance with the state of each of the end surfaces F1*a* and F2*a* include at least one, and more preferably three or more selected from a group of (1) positions of the end surfaces F1*a* and F2*a* before discharge starts, (2) a gap between the end surfaces F1*a* and F2*a* before discharge starts, (3) a preliminary discharge time, (4) a main discharge time, (5) a push-in amount after the end surfaces F1*a* and F2*a* have been brought into contact with each other, and (6) a retraction amount after the end surfaces F1*a* and F2*a* have been pushed in toward each other.

(1) Positions of End Surfaces F1*a* and F2*a* Before Discharge Starts

Figure 14:
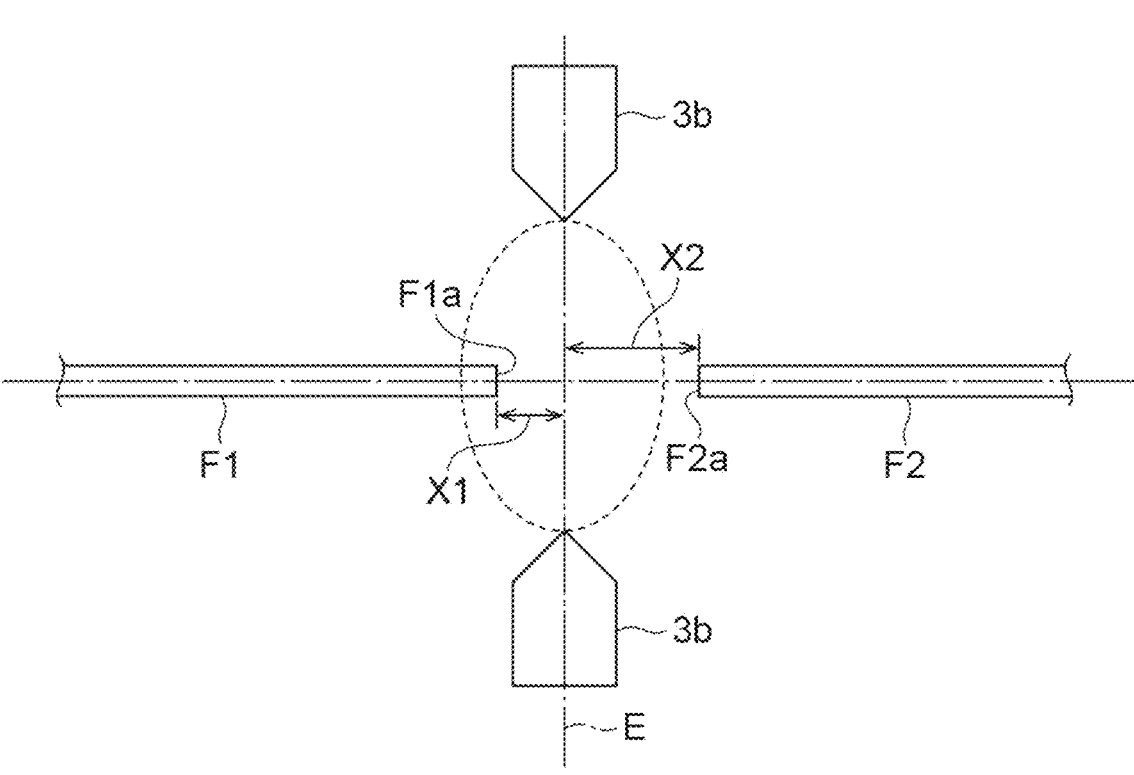
FIG. 14 is a view schematically illustrating positions of the end surfaces before discharge starts.

Positions of the end surfaces F1*a* and F2*a* before discharge starts denote positions X1 and X2 of the end surfaces F1*a* and F2*a* based on a line E (discharge center axis) connecting the center axes of the pair of electrode bars 3*b* in the state illustrated in FIG. 14, that is, at a start time of preliminary discharge. A heating amount (melting amount) increases and decreases as distances between a discharge center and the end surfaces F1*a* and F2*a* change in accordance with these end surface positions X1 and X2. In addition, a time required for movement until the end surfaces F1*a* and F2*a* abut each other varies in accordance with these end surface positions X1 and X2.

When the depth of the chip A illustrated in FIG. 9 is equal to or larger than a predetermined value (for example, 10 μm), the end surface F1*a* or F2*a* having the chip A is brought closer to a discharge center axis E compared to, for example, predetermined end surface reference positions, that is, optimum values of the end surface positions X1 and X2 which have been set in advance on the assumption that there is no abnormality on the end surfaces F1*a* and F2*a*. In other words, the end surface position X1 or X2 based on the discharge center axis E is reduced. At this time, the end surface position X1 or X2 is set to approximately 70% of the end surface reference position, for example. Accordingly, a splicing loss can be reduced. In this case, the condition setting unit 14 calculates the end surface positions X1 and X2 based on the discharge center axis E using a predetermined calculation expression on the basis of the depth of the chip A obtained from an image. In addition, when one or both of the lip B illustrated in FIG. 11 and the inclination of the end surface F2*a* illustrated in FIG. 13 is present, for example, a median value of a difference between a largest value Xa and a smallest value Xb of the end surface position X1 or X2 of the end surface F1*a* or F2*a* having the lip B or the inclination is caused to coincide with the predetermined end surface reference position. Accordingly, a splicing loss can be reduced. In this case, the condition setting unit 14 calculates the end surface position X1 or X2 using a predetermined calculation expression on the basis of the largest value Xa and the smallest value Xb obtained from an image.

(2) Gap Between End Surfaces F1*a* and F2*a* Before Discharge Starts

A gap between the end surfaces F1*a* and F2*a* before discharge starts denotes a gap D between the end surfaces F1*a* and F2*a* in the state illustrated in FIG. 6, that is, at the start time of preliminary discharge. The time required for movement until the end surfaces F1*a* and F2*a* abut each other varies in accordance with this gap D. When the depth of the chip A illustrated in FIG. 9 is equal to or larger than the predetermined value (for example, 10 μm), for example, a splicing loss can be reduced by further reducing the gap D than a predetermined end surface gap reference value. The end surface gap reference value is an optimum value of the gap D which has been set in advance on the assumption that there is no abnormality on the end surfaces F1*a* and F2*a*. The gap D is set to approximately 70% of the end surface gap reference value, for example. In this case, the condition setting unit 14 calculates the gap D using a predetermined calculation expression on the basis of the depth of the chip A obtained from an image. When one or both of the lip B illustrated in FIG. 11 and the inclination of the end surface F2*a* illustrated in FIG. 13 is present, for example, a median value of a difference between a largest gap Da and a smallest gap Db between the end surfaces F1*a* and F2*a* is caused to coincide with the predetermined end surface gap reference value. Accordingly, a splicing loss can be reduced. In this case, the condition setting unit 14 calculates the gap D using a predetermined calculation expression on the basis of the difference between the largest gap Da and the smallest gap Db obtained from an image.

(3) Preliminary Discharge Time

A preliminary discharge time denotes a period of time from the time when arc discharge starts in the state illustrated in FIG. 6 to the time when relative movement of the optical fibers F1 and F2 starts so as to cause the end surfaces F1a and F2a to abut each other. When the depth of the chip A illustrated in FIG. 9 is equal to or larger than the predetermined value (for example, 10 μm), the chip A can be made small (shallow) when the end surfaces F1a and F2a abut each other by, for example, further lengthening the preliminary discharge time than a predetermined reference time, and thus a splicing loss can be reduced. The reference time is an optimum length of the preliminary discharge time which has been set in advance on the assumption that there is no abnormality on the end surfaces F1a and F2a. The preliminary discharge time is set to 1.3 times or more and 2 times or less of the reference time, for example. In this case, the condition setting unit 14 calculates the preliminary discharge time using a predetermined calculation expression on the basis of the depth of the chip A obtained from an image. When one or both of the lip B illustrated in FIG. 11 and the inclination of the end surface F2a illustrated in FIG. 13 is present, for example, the preliminary discharge time is further lengthened than the predetermined reference time. Accordingly, the lip B can be made small or the inclination can be reduced when the end surfaces F1a and F2a abut each other, and thus a splicing loss can be reduced. At this time, the preliminary discharge time is set to 1.3 times or more and 2 times or less of the reference time, for example. In this case, the condition setting unit 14 calculates the preliminary discharge time using a predetermined calculation expression on the basis of a protruding amount of the lip B or an angle of the inclination obtained from an image.

(4) Main Discharge Time

A main discharge time denotes a period of time from the time when the end surfaces F1a and F2a abut each other to the time when arc discharge ends. In other words, the main discharge time is a period of time from the time when the end surfaces F1a and F2a abut each other to the time when applying of a voltage to the pair of electrode bars 3b stops. Preliminary discharge and main discharge are temporally continuously performed. When the chip A illustrated in FIG. 9 is present on the end surface F1a or F2a, axial deviation progresses during fusion splicing starting from the chip A. Therefore, for example, the amount of axial deviation can be reduced by further shortening the main discharge time than the predetermined reference time, and thus a splicing loss can be reduced. The reference time is an optimum length of the main discharge time which has been set in advance on the assumption that there is no abnormality on the end surfaces F1a and F2a. The main discharge time is set to 30% or more and 70% or less of the reference time, for example. In this case, the condition setting unit 14 calculates the main discharge time using a predetermined calculation expression on the basis of the depth of the chip A obtained from an image. When one or both of the lip B illustrated in FIG. 11 and the inclination of the end surface F2a illustrated in FIG. 13 is present, axial deviation progresses during fusion splicing starting from an outer edge portion which is located farthest from the end surface on the opposition side, in other words, which is retracted farthest on the end surface. Therefore, for example, the amount of axial deviation can be reduced by further shortening the main discharge time than the predetermined reference time, and thus a splicing loss can be reduced. The main discharge time is set to 30% or more and 70% or less of the reference time, for example. In this case, the condition setting unit 14 calculates the main discharge time using a predetermined calculation expression on the basis of the protruding amount of the lip B or the angle of the inclination obtained from an image.

(5) Push-In Amount after End Surfaces F1a and F2a have been Brought into Contact With Each Other The push-in amount after the end surfaces F1a and F2a have been brought into contact with each other denotes a movement distance by which the optical fibers F1 and F2 are relatively moved further in the same direction during discharge after the optical fibers F1 and F2 have been relatively moved and the end surfaces F1a and F2a have abutted each other from the state illustrated in FIG. 6. When the chip A illustrated in FIG. 9 is present on the end surface F1a or F2a, axial deviation progresses during fusion splicing starting from the chip A. Therefore, for example, progress of axial deviation during fusion splicing can be curbed by further increasing the push-in amount than a predetermined reference push-in amount, and thus a splicing loss can be reduced. The reference push-in amount is an optimum value of the push-in amount which has been set in advance on the assumption that there is no abnormality on the end surfaces F1a and F2a. The push-in amount is set to 150% of the reference push-in amount or larger, for example. In this case, the condition setting unit 14 calculates the push-in amount using a predetermined calculation expression on the basis of the depth of the chip A obtained from an image. When one or both of the lip B illustrated in FIG. 11 and the inclination of the end surface F2a illustrated in FIG. 13 is present, the gap D varies within the end surface. Therefore, for example, an effect of in-surface variation in the gap D can be suppressed by further increasing the push-in amount than the reference push-in amount, and thus a splicing loss can be reduced. At this time, the push-in amount is set to 120% of the reference push-in amount or larger, for example. In this case, the condition setting unit 14 calculates the push-in amount using a predetermined calculation expression on the basis of the protruding amount of the lip B or the angle of the inclination obtained from an image. The calculated push-in amount also includes a case where the push-in amount is zero, that is, a case where pushing-in is not performed.

(6) Retraction Amount after End Surfaces F1a and F2a have been Pushed in Toward Each Other the retraction amount after the end surfaces F1a and F2a have been pushed in toward each other denotes a movement distance by which the optical fibers F1 and F2 are relatively moved in the opposite direction, that is, in a direction in which the end surfaces F1a and F2a are separated from each other during fusion splicing after the end surfaces F1a and F2a have abutted each other and the end surfaces F1a and F2a are further pushed in toward each other. When the chip A illustrated in FIG. 9 is present on the end surface F1a or F2a, there is concern that the push-in amount described above may become non-uniform within a cross section orthogonal to the center axes of the optical fibers F1 and F2. When it becomes non-uniform, a core portion may be deformed, and a splicing loss may increase. Therefore, for example, a splicing loss can be reduced by performing retraction corresponding to 20% of the push-in amount or larger. In this case, the condition setting unit 14 calculates the retraction amount using a predetermined calculation expression on the basis of the depth of the chip A obtained from an image. When one or both of the lip B illustrated in FIG. 11 and the inclination of the end surface F2a illustrated in FIG. 13 is present, there is concern that the push-in amount described above may become non-uniform within the end surface. When it becomes non-uniform, a splicing loss may increase due to deformation of the core portion. Therefore, for example, a splicing loss can be reduced by performing retraction corresponding to 20% of the push-in amount or larger. In this case, the condition setting unit 14 calculates the retraction amount using a predetermined calculation expression on the basis of the protruding amount of the lip B or the angle of the inclination obtained from an image. The calculated retraction amount also includes a case where the retraction amount is zero, that is, a case where retraction is not performed.

Further, the splicing conditions set in accordance with the state of each of the end surfaces F1a and F2a may include the following (7) preliminary discharge power.

(7) Preliminary Discharge Power

The preliminary discharge power denotes are discharge power during a period from the time when arc discharge starts in the state illustrated in FIG. 6 to the time when relative movement of the optical fibers F1 and F2 starts so as to cause the end surfaces F1a and F2a to abut each other. When the depth of the chip A illustrated in FIG. 9 is equal to or larger than the predetermined value (for example, 10 μm), for example, preliminary discharge power is further increased than a reference value of a predetermined preliminary discharge power. Accordingly, since the degree of softening the end surfaces F1a and F2a increases, the chip A can be made small (shallow) when they abut each other, and thus a splicing loss can be reduced. The reference value of the preliminary discharge power is an optimum value of the preliminary discharge power which has been set in advance on the assumption that there is no abnormality on the end surfaces F1a and F2a. In this case, the condition setting unit 14 calculates the preliminary discharge power using a predetermined calculation expression on the basis of the depth of the chip A obtained from an image. When one or both of the lip B illustrated in FIG. 11 and the inclination of the end surface F2a illustrated in FIG. 13 is present, for example, the preliminary discharge power is further increased than the reference value. Accordingly, the lip B can be made small or the inclination can be reduced when the end surfaces F1a and F2a abut each other, and thus a splicing loss can be reduced. At this time, preliminary discharge power is set to 1.3 times or more and 2 times or less of the reference value, for example. In this case, the condition setting unit 14 calculates the preliminary discharge power using a predetermined calculation expression on the basis of the protruding amount of the lip B or the angle of the inclination obtained from an image.

As described above, in operation of the fusion splicer 10 according to the present embodiment, the state of each of the end surfaces F1a and F2a of the two optical fibers F1 and F2 is analyzed and identified on the basis of an observation image thereof. Further, the splicing conditions are set in accordance with the state of each of the end surfaces F1a and F2a. That is, when there is no abnormality on both the end surfaces F1a and F2a as a result of analyzing the state of each of the end surfaces F1a and F2a, predetermined reference splicing conditions are set. When there is abnormality on one or both of the end surfaces F1a and F2a as a result of analyzing the state of each of the end surfaces F1a and F2a, splicing conditions different from the predetermined reference splicing conditions are set in accordance with the state of the end surface having abnormality.

Figure 15:
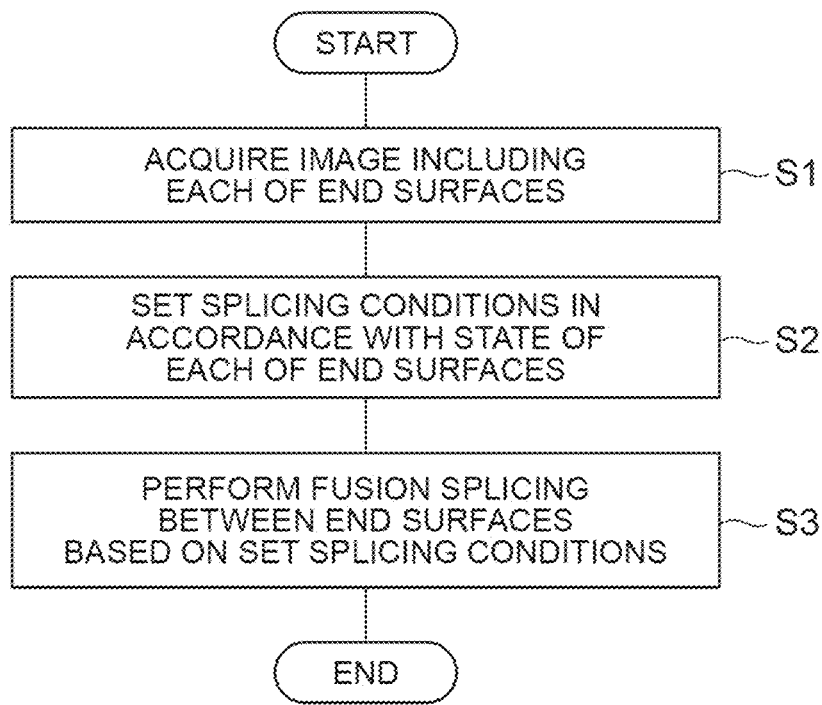
FIG. 15 is a flowchart showing a fusion splicing method according to the embodiment.

FIG. 15 is a flowchart showing a fusion splicing method according to the present embodiment. This fusion splicing method may be favorably realized using the fusion splicer 10 described above. First, regarding an image acquiring step S1, in a state in which the end surfaces F1a and F2a of the optical fibers F1 and F2 (splicing targets) are disposed to face each other (refer to FIG. 6), an image including each of the end surfaces F1a and F2a is acquired by the cameras 9. Next, regarding a condition setting step S2, after the state of each of the end surfaces F1a and F2a, for example, the presence or absence of at least one of the chip A, the lip B, and the inclination of the end surface and the magnitude thereof are identified on the basis of an acquired image, the splicing conditions are set in accordance with the state of each of the end surfaces F1a and F2a. As described above, the splicing conditions set in accordance with the state of each of the end surfaces F1a and F2a include at least one, and more preferably three or more selected from the group of (1) positions of the end surfaces F1a and F2a before discharge starts, (2) a gap between the end surfaces F1a and F2a before discharge starts, (3) a preliminary discharge time, (4) a main discharge time, (5) a push-in amount after the end surfaces F1a and F2a have been brought into contact with each other, and (6) a retraction amount after the end surfaces F1a and F2a have been pushed in toward each other. The splicing conditions may further include the foregoing (7) preliminary discharge power. Subsequently, regarding a fusion splicing step S3, the end surfaces F1a and F2a are fusion-spliced together by means of arc discharge between the pair of electrode bars 3b in accordance with the splicing conditions set in the step S2.

As described above, in the fusion splicing method according to the present embodiment, the state of each of the end surfaces F1a and F2a of the two optical fibers F1 and F2 is analyzed and identified on the basis of an observation image thereof. Further, the splicing conditions are set in accordance with the state of each of the end surfaces F1a and F2a. That is, when there is no abnormality on both the end surfaces F1a and F2a as a result of analyzing the state of each of the end surfaces F1a and F2a, predetermined reference splicing conditions are set. When there is abnormality on one or both of the end surfaces F1a and F2a as a result of analyzing the state of each of the end surfaces F1a and F2a, splicing conditions different from the predetermined reference splicing conditions are set in accordance with the state of the end surface having abnormality.

Effects achieved by the fusion splicer 10 and the fusion splicing method according to the present embodiment described above will be described. In the fusion splicer 10 and the fusion splicing method according to the present embodiment, the splicing conditions set in accordance with the state of each of the end surfaces F1a and F2a include at least one selected from the group of (1) the positions of the end surfaces F1a and F2a before discharge starts, (2) the gap between the end surfaces F1a and F2a before discharge starts, (3) the preliminary discharge time, (4) the main discharge time, (5) the push-in amount after the end surfaces F1a and F2a have been brought into contact with each other, and (6) the retraction amount after the end surfaces F1a and F2a have been pushed in toward each other. In this case, for example, compared to a case where only a discharge energy amount (discharge power) is controlled as in the device described in Patent Literature 1, more favorable splicing conditions can be set in accordance with the state of the end surfaces F1a and F2a of the optical fibers F1 and F2. Thus, the quality of fusion splicing can be further enhanced and a splicing loss can be reduced.

The splicing conditions set in accordance with the state of each of the end surfaces F1*a* and F2*a* may include at least three selected from the group of the foregoing (1) to (6). In this case, the quality of fusion splicing can be far further enhanced, and a splicing loss can be further reduced.

The optical fiber fusion splicer and the method for fusion splicing optical fibers according to the present disclosure are not limited to the embodiment described above, and various other deformation can be performed. For example, three elements such as a chip, a lip, and an inclination have been exemplified as a state of an end surface of an optical fiber in the foregoing embodiment. However, a state of an end surface of an optical fiber, which is information for making a decision when the splicing conditions are set, may include various states other than these. The splicing conditions set in accordance with the state of each of the end surfaces F1*a* and F2*a* may include other conditions in addition to at least one of (1) to (6). Examples of other conditions include an amount of relative axial deviation between the optical fibers F1 and F2, and a time interval between processes of discharge when discharge is intermittently performed. This discharge power may be included in the splicing conditions or may be constant regardless of the state of an end surface of an optical fiber. The splicing conditions set in accordance with the state of each of the end surfaces F1*a* and F2*a* of the optical fibers F1 and F2 include a condition for setting an amount of change from the reference splicing conditions in accordance with the state of each of the end surfaces F1*a* and F2*a*, together with the reference splicing conditions.

REFERENCE SIGNS LIST

2 Casing
3 Fusion splicing unit
3*a* Fiber positioning unit
3*b* Electrode bars
3*c* Optical fiber holder
4 Heater
5 Monitor
6 Windshield cover
7 Power source switch
8 Splicing start switch
9 Camera
10 Fusion splicer
12 Fusion control unit
12*a* CPU
12*b* RAM
12*c* ROM
13 Basic control unit
14 Condition setting unit
A Chip
B Lip
CL Cladding
CR Core
D Gap
Da Largest gap
Db Smallest gap
F1 First optical fiber
F1*a* End surface
F2 Second optical fiber
F2*a* End surface
MSX, MSY Direction
PX, PY Image

What is claimed is:

1. An optical fiber fusion splicer comprising:
an image acquisition unit configured to acquire an image including each of end surfaces of first and second optical fibers that are splicing targets in a state where the end surfaces of the first and second optical fibers are disposed to face each other;
a condition setting unit configured to identify a state of each of the end surfaces on a basis of the image and set splicing conditions in accordance with the state of each of the end surfaces, the splicing conditions including at least one of the following items, positions of the end surfaces before discharge starts, a gap between the end surfaces before discharge starts, a preliminary discharge time, a main discharge time, a push-in amount after the end surfaces have been brought into contact with each other, and a retraction amount after the end surfaces have been pushed in toward each other; and
a fusion splicing unit configured to fusion-splice the first and second optical fibers together by means of discharge between a pair of electrode bars in accordance with the splicing conditions set by the condition setting unit, wherein
the splicing conditions include at least the retraction amount after the end surfaces have been pushed in toward each other; and
wherein the condition setting unit is configured to:
set a predetermined reference retraction amount when there is no abnormality on either of the end surfaces of the first and second optical fibers; and
set a different retraction amount from the predetermined reference retraction amount in accordance with a state of an abnormal end surface when there is an abnormality on at least one of the end surfaces of the first and second optical fibers.

2. The optical fiber fusion splicer according to claim 1, wherein the splicing conditions further include at least two selected from the group of the positions, the gap, the preliminary discharge time, the main discharge time, and the push-in amount.

3. The optical fiber fusion splicer according to claim 1, wherein the splicing conditions further include the positions, and
wherein the positions are positions of the end surfaces based on a line connecting center axes of the pair of electrode bars at a start time of preliminary discharge.

4. The optical fiber fusion splicer according to claim 1, wherein the splicing conditions further include the preliminary discharge time, and
wherein the preliminary discharge time is a period of time from a time when arc discharge starts to a time when relative movement of the first and second optical fibers starts so as to cause the end surfaces to abut each other.

5. The optical fiber fusion splicer according to claim 1, wherein the splicing conditions further include the main discharge time, and
wherein the main discharge time is a period of time from a time when the end surfaces abut each other to a time when applying of a voltage to the pair of electrode bars stops.

6. The optical fiber fusion splicer according to claim 1, wherein the splicing conditions further include the push-in amount, and
wherein the push-in amount is a movement distance by which the first and second optical fibers are relatively moved further in a same direction during discharge after the end surfaces have abutted each other.

7. The optical fiber fusion splicer according to claim 1, wherein the retraction amount is a movement distance by which the first and second optical fibers are relatively moved in a direction in which the end surfaces are separated from each other during fusion splicing after the end surfaces have abutted each other and are further pushed in toward each other.

8. The optical fiber fusion splicer according to claim 1, wherein the state of each of the end surfaces includes a generation position and a depth of a recess of each of the end surfaces.

9. The optical fiber fusion splicer according to claim 1, wherein the state of each of the end surfaces includes a generation position and a height of a protrusion of an edge portion of each of the end surfaces.

10. The optical fiber fusion splicer according to claim 1, wherein the state of each of the end surfaces includes a direction and an angle of an inclination of each of the end surfaces.

* * * * *